United States Patent [19]

Sorrick

[11] Patent Number: 5,714,067
[45] Date of Patent: Feb. 3, 1998

[54] HIGH EFFICIENCY AND HIGH CAPACITY FILTER MEDIA

[76] Inventor: Charles H. Sorrick, 929 Aspen, Rochester, Mich. 48307

[21] Appl. No.: 626,362

[22] Filed: Apr. 2, 1996

[51] Int. Cl.⁶ .................................................. B01D 39/16
[52] U.S. Cl. .................... 210/490; 210/508; 55/486; 55/527; 55/DIG. 5; 428/193; 428/301; 264/248; 264/258
[58] Field of Search ..................... 210/508, 488, 210/489, 490; 55/486, 487, 524, 528, DIG. 5, DIG. 39, 514, 485, 489, 527; 428/192, 193, 219, 220, 300, 301; 493/338, 339, 941; 264/248, 258

[56] References Cited

U.S. PATENT DOCUMENTS

| | | |
|---|---|---|
| 4,211,661 | 7/1980 | Perry ................................. 210/491 |
| 5,149,576 | 9/1992 | Potts et al. ......................... 428/198 |
| 5,409,669 | 4/1995 | Smith et al. ........................ 55/523 |
| 5,558,658 | 9/1996 | Menard et al. . |
| 5,599,366 | 2/1997 | Hassenboehler, Jr. et al. ......... 55/486 |

*Primary Examiner*—W. L. Walker
*Attorney, Agent, or Firm*—Reising, Ethington, Barnard & Perry

[57] ABSTRACT

A high efficiency and high capacity filter medium including a top layer of fibrous felt material, an intermediate layer of melt-blown material, and a substrate layer needled together into an integrated layer of filter material. The substrate layer is formed of a layer of composite fiber including a group of melt-blown fibers interspersed between groups of spun-bonded fibers. Alternatively, the substrate layer is formed of spun-bonded material.

22 Claims, 2 Drawing Sheets

HIGH EFFICIENCY AND HIGH CAPACITY FILTER MEDIA

TECHNICAL FIELD

The subject invention relates to a filter medium supported across a fluid flow passage for collecting particulate out of the fluid.

BACKGROUND ART

Many industrial applications utilize fluids during the manufacture of metal products as a coolant or to remove debris and extraneous material from the products. Generally, a high volume of fluid is utilized which is recycled and reused throughout the manufacturing process. The fluid will necessarily collect debris and unwanted material which must be filtered out of the fluid to permit the fluid to be reused. Without filtration, the debris and particulate in the fluid would quickly build up to a level at which the fluid would no longer efficiently perform its intended function and could also damage the products and machinery in the manufacturing process. In many applications, it is essential that almost all of the debris be removed from the fluid during recirculation of the fluid for subsequent use.

Filter media used to collect particulate out of a fluid flow have previously been either of a high efficiency type or a long life type. The high efficiency type are characterized by collecting a large quantity of particulate out of the fluid flow by using very small diameter pore openings in the filter media to collect very small particulate out of the fluid flow. Unfortunately, high efficiency filters are prone to rapid congestion and must be frequently changed. There is also a relatively high pressure drop across high efficiency filters due to the relatively small pore size in the filter medium. Therefore, high efficiency filters have a short life, are expensive to use, inhibit the fluid flow, and do not allow for fast filtration as evidenced by the large pressure drop.

Long life filters, on the other hand, include larger diameter pore openings in the filter medium so that only larger particulate is collected. Thus, long life filters do not rapidly congest with particulate and are less costly to operate because of the relatively infrequent changing required. However, the long-life filters cannot collect relatively small sized particulate out of the fluid flow and will not clean the fluid as well as a high efficiency filter. Unfiltered debris within the fluid can result in accelerated wear of the forming machines as well as potential damage or wear on the newly formed components.

Therefore, there is a great need in this art for filter media which both remove very small particulate out of the fluid flow and possess long life properties to withstand rapid clogging.

U.S. Pat. No. 4,211,661 to Perry discloses a filter medium comprising a top layer of fibrous polypropylene felt and a substrate layer composed of discrete laminations of melt-blown and spun-bonded material joined together through the application of heat and pressure. The fibrous felt layer is on the upstream side of the filter material, whereas the melt-blown material is on the down-stream side of the filter material. The three layers are joined together by needling from the upstream side of the filter medium and heat-fusing the needled fibers that extend through the down-stream side of the filter material.

Although the filter material disclosed in the '661 reference provides modest filtering efficiency, the filter has a very low capacity and a short life. The melt-blown material, with its relatively small pore size, provides a large pressure drop across the filter medium which increases with the thickness of the melt-blown layer. Unfortunately, the layer of melt-blown material must be of a minimum thickness to prevent destruction or damage to the layer during the lamination process and during handling of the layer prior to the lamination process. The fluid flow through the melt-blown layer is further restricted by heat-fusing the needled fibers together at the downstream side of the filter medium, virtually sealing the needle passages through the melt-blown layer. Further, the melt-blown material is relatively weak and has little internal stiffness. The use of melt-blown material as a substrate not only exposes the melt-blown material to damage from contact with external structure of the filtering system, but also provides insufficient stiffness to the filter medium under high pressure flow conditions.

Other prior art filter media have been designed to provide high efficiency and/or high capacity. For example, a high efficiency filter material known as "SMS" material has been developed for use in medical related applications. SMS material comprises a composite layer of spun-bonded and melt-blown fibers which is created by placing a group of extruded melt-blown fibers between groups of extruded spun-bonded fibers on a moving conveyor. A heated roller, which may include nubs thereon, enmeshes and entangles the fibers into a composite layer, albeit with the melt-blown fibers generally located within the middle of the layer. By forming the SMS during the creation and extrusion of the melt-blown and spun-bonded fibers, a much thinner layer of melt-blown fibers can be utilized than would otherwise be possible. Unfortunately, although SMS has a high filter efficiency, it does not, by itself, provide any sufficient capacity and/or long life characteristics, rendering it impractical for most industrial applications.

SUMMARY OF THE INVENTION AND ADVANTAGES

The subject invention provides a filter medium of the type supported across a fluid flow passage for collecting particulate out of the fluid. The filter medium includes a substrate layer of composite fiber including a group of melt-blown fibers interspersed between groups of spun-bonded fibers. An intermediate layer of melt-blown material is disposed adjacent the substrate layer, and a top layer of fibrous felt material is disposed adjacent the intermediate layer. The intermediate layer, top layer, and substrate layer are joined together by needling to form an integrated layer of filter material.

The subject invention also provides a filter medium of the type supported across a fluid flow passage for collecting particulate out of the fluid including a substrate layer of spun-bonded material on a downstream side of the filter medium, an intermediate layer of melt-blown material disposed adjacent the substrate layer, and a top layer of fibrous felt material disposed adjacent the intermediate layer. The substrate layer, intermediate layer, and top layer are joined together by needling to form an integrated layer of filter material.

The subject invention also provides a method of forming a filter medium of the type supported across a fluid flow passage for collecting particulate out of the fluid. The method includes the steps of providing a substrate layer of composite fiber including melt-blown fibers interspersed between groups of spun-bonded fibers. An intermediate layer of melt-blown material is placed adjacent the substrate layer, and a top layer of fibrous felt material is placed adjacent the intermediate layer on an upstream side of the filter medium to sandwich the intermediate layer between the substrate layer and the top layer. The top layer, intermediate layer, and substrate layer are needled together to form an integrated layer of filter material.

The subject invention overcomes many of the disadvantages in the prior art by providing a well dispersed mixture of melt-blown and spun-bonded fibers within a filter medium to combine the benefits of high efficiency from the melt-blown fibers and high capacity/long life from the spun-bonded fibers. The use of either spun-bonded material or SMS as a substrate provides added strength and stability to the filter material which is beneficial under high pressure flow conditions. Using SMS as the substrate also yields added efficiency by providing a second layer of melt-blown material, without significantly increasing the pressure drop due to the ability to utilize a relatively thin layer of melt-blown material within the SMS layer. Using spun-bonded material as the substrate provides less efficiency than the use of SMS, but greater holding capacity and longer life than with the SMS. In both embodiments, the relatively weak melt-blown material is protected from damage by the stronger spun-bonded fibers and/or the fibrous felt layer.

BRIEF DESCRIPTION OF THE DRAWINGS

Other advantages of the present invention will be readily appreciated from the following detailed description of the invention when considered in connection with the accompanying drawings wherein.

DETAILED DESCRIPTION OF THE INVENTION

Figure 1:
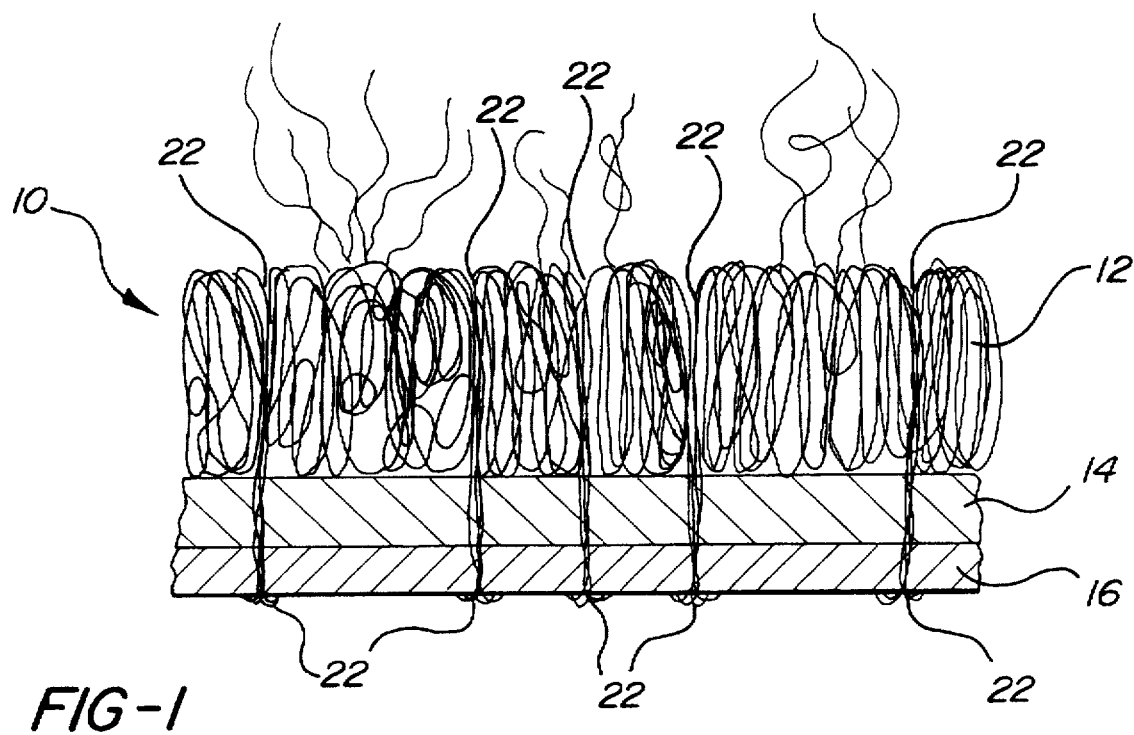
FIG. 1 is an enlarged cross-sectional view of a first embodiment of the filter medium invention.

The subject invention generally relates to an improved filter medium for collecting particulate from fluids used in industrial applications. A first embodiment of the filter medium is generally shown at 10 in FIG. 1 and comprises several sublayers of distinct material which are needled together into a single integrated layer. The filter medium includes a top layer 12 of fibrous needle felt material on an upstream side of the filter medium 10 and an intermediate layer 14 of melt-blown material adjacent the top layer 12 of fibrous felt material. A substrate layer 16 of composite fiber, known as "SMS" material, is provided including melt-blown fibers interspersed between groups of spun-bonded fibers.

The top layer 12 of needle felt comprises 2.0 ounces per square yard of polyester needle felt, although the specific weight and composition of the needle felt is not critical. Various deniers of the fiber in the polyester needle felt have also been experimented with, including a composite of 50 percent 4 denier fibers and 50 percent 3 denier fibers, as well as 100 percent 3 denier fibers. At present, both compositions provide distinct advantages to the filter material 10 of the present invention. In the preferred embodiment, the needle felt includes a thickness of between 0.030 and 0.050 inches.

To form a typical lamination of needle felt, a group of fibers is placed on top of a supporting scrim and the needles entangle the fibers together and about the scrim. Similarly, in the preferred embodiment, the needle felt is formed during the needling together of the various layers 12,14,16 by substituting the intermediate and substrate layers 14,16 for the supporting scrim. In other words, the fibers of the needle felt layer 12 are not formed into a layer of needle felt until the needling process joins the top, intermediate, and substrate layers 12,14,16 together. The top layer of needle felt 12 is, thus, formed into the intermediate and substrate layers 14, 16 during the needling process.

The intermediate layer 14 comprises, in the preferred embodiment, approximately 1.0 ounces per square yard of polypropylene melt-blown material. The intermediate layer 14 is a preformed web of melt-blown material which is placed, as a discrete layer, between the top layer 12 of needle felt and the substrate layer 16 of SMS material. As will be discussed in more detail below, the needling process joins the intermediate layer to the top layer and substrate layer by entangling the fibers to form a single, integrated layer of filter material. In the preferred embodiment, the intermediate layer of melt-blown material includes a thickness of between 0.016 and 0.028 inches, and a fiber diameter of between 1 and 5 microns.

Figure 3:
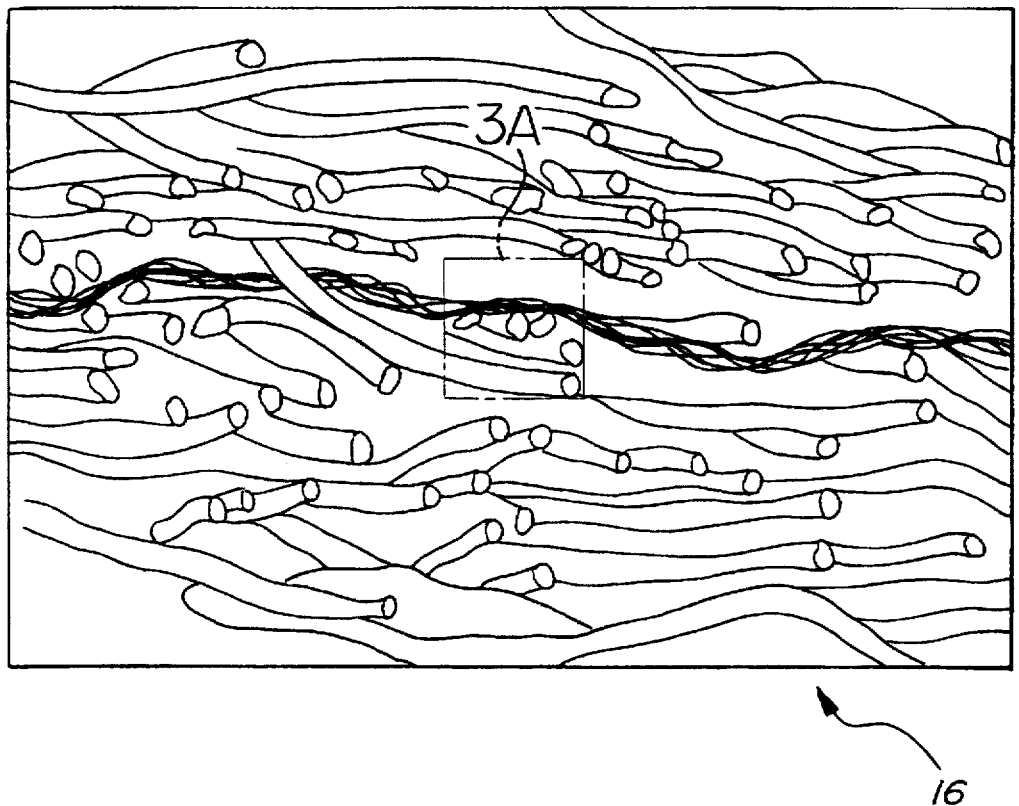
FIG. 3 is a magnified view of the substrate layer of the first embodiment of the filter medium invention.
Figure 3A:
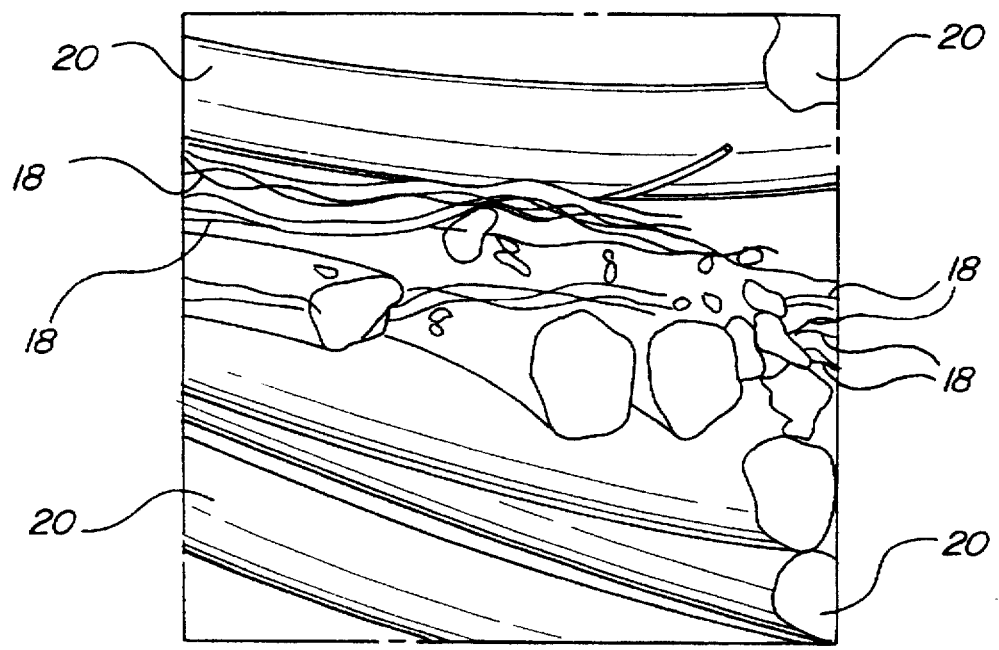

As shown in the magnified view of FIG. 3, SMS is a composite material formed from a group of melt-blown fibers 18 interspersed between two groups of spun-bonded fibers 20. To create the SMS material, a group of polymeric melt-blown fibers 18 is extruded along with first and second groups of polymeric spun-bonded fibers 20. The fibers 18,20 are placed on a moving conveyor such that the group of melt-blown fibers 18 is disposed between the first and second groups of spun-bonded fibers 20. A heated roll, preferably including projections or nubs thereon, applies heat and pressure to the fibers to enmesh and entangle the fibers 18,20 into a composite web 16 while creating indentations (not shown) in the SMS web. The melt-blown fibers 18 are disposed generally within the middle of the SMS web 16 and do not extend to the top or bottom surface of the web 16. It is also readily apparent that the melt-blown fibers 18, being smaller than the spun-bonded fibers 20, provide much smaller flow passages therethrough and will consequently retain smaller particulate from passing through the filter 10.

In the preferred embodiment, the SMS web 16 includes a thickness of between 0.010 and 0.020 inches. The melt-blown fibers 18 in the SMS web 16 have a diameter of between 2 and 2.5 microns, whereas the spun-bonded fibers 20 have a diameter of between 20–40 microns. Further, the group of melt-blown fibers 18 in the SMS web 16 has a weight of less than 0.6 ounces per square yard, preferably about 0.2 ounces per square yard. As previously discussed, the formation of SMS material from individual fibers of melt-blown material allows any desired weight of melt-blown material, however small, to be used in the resulting composite layer. By comparison, a standard layer of melt-blown material requires at least 0.6 ounces per square yard for any significant stability of the layer, increasing the restriction to the fluid flowing through the filter medium. Reducing the weight of the melt-blown fibers in the SMS material to less than 0.6 ounces per square yard does not significantly reduce the efficiency of the filter media, but does have a marked effect on the restriction of fluid flow through the filter.

By utilizing SMS material as a substrate layer, many advantages are appreciated. The additional group of melt-blown fibers in the SMS layer supplement the filter efficiency provided by the intermediate layer 14 of melt-blown material. The groups of spun-bonded fibers 20 on opposite sides of the melt-blown 18 fibers provide added strength and stability to the SMS web 16 and, hence, the filter material 10 as a whole, preventing deformation and destruction of the filter material 10 during high pressure flow through the filter material. The spun-bonded material 20 within the SMS 16 also provides for added filter capacity in the filter medium 10.

Further, the needling process creates holes 22 through both the intermediate layer of melt-blown material 14 as well as the group of melt-blown fibers 18 in the SMS substrate 16, providing additional passages for fluid flow thereby reducing the pressure drop across the melt-blown material. The needle holes 22 also take longer to clog than the relatively small pores in the melt-blown material, increasing the life of the filter at the cost of reduced efficiency. However, due to differences in tension within the various layers during use of the filter 10, the needle holes 22 in the intermediate layer of melt-blown material 14 and in the melt blown fibers 18 in the substrate layer 16 will not be precisely aligned. Thus, small particles of debris passing through the needle holes 22 in the intermediate layer 14 will be prevented from passing through the needle holes 22 in the SMS layer 16 and will, instead, be trapped by the melt-blown fibers 18 in the SMS layer 16. Any loss in efficiency that would ordinarily exist due to the needle holes 22 is at least partially compensated for by the offsetting needle holes 22 in the SMS layer.

Compared to a simple lamination of spun-bonded, melt-blown, and spun-bonded materials, SMS has significant filtration advantages. It has been found that the composite SMS material has approximately three times the dirt holding capacity than the laminated layer, has less resistance to fluid flow, and no reduction in efficiency compared to a laminated layer.

The following is an illustration of the benefit of using SMS material in the filter medium of the present invention. SMS material by itself can have an efficiency of approximately 90 percent. In other words, approximately 90 percent of the particulate material in a fluid is removed by the SMS material under typical operating conditions. However, the high efficiency results in a "blind off," or exhaustion of filter capacity, within less than one minute under typical flow conditions. By contrast, a layer of melt-blown material, by itself, would have approximately 50 percent efficiency with a 5 minute blind-off time under typical flow conditions. The first embodiment of the filter material of the present invention (including a substrate of SMS material) provides a 70 percent efficiency with an 11 minute blind-off time under typical flow conditions. Thus, with only a slight reduction in efficiency compared to SMS alone, the filter material of the present invention provides significantly increased capacity for the filter material and, thus, longer life.

In the preferred embodiment, the total weight of the filter medium 10 is between 3.5 and 5.5 ounces per square yard, with the main variation arising from the weight of the SMS substrate layer 16. At present, SMS material including both 1.5 ounces per square yard and 2.5 ounces per square yard have been tested, and each provide distinct filtration advantages for this invention. As discussed above, the melt-blown fibers 18 in the SMS web 16 comprise approximately 0.2 ounces per square yard of material. Thus, in a 1.5 ounce SMS web, two groups of 0.65 ounces per square yard of spun-bonded material are used, as opposed to two groups of 1.15 ounces per square yard in a 2.5 ounce SMS web. The total thickness of the filter medium is approximately 90 thousandths of an inch.

The needling process utilizes 40 gauge needles at a density of 250 per linear inch to join the top layer 12, the intermediate layer 14, and the substrate layer 16 into a single integrated layer 10. The needling process forcefully pushes and/or pulls fibers from one layer into adjacent layers to entangle the various fibers. Although the needling process does not create a homogeneous mixture of fibers, significant intermixing of fibers occurs to join the various layers together into an integrated layer of filter material. The needling process also creates a plurality of needle holes 22 having a size of between 25 and 60 microns within the various layers 12,14,16 which create additional pores for trapping particulate and for permitting fluid to flow therethrough. The fibers within the needle felt layer 12 are pushed into the needle holes 22 to partially fill the needle holes 22 and also extend outwardly from the needle holes 22 adjacent the substrate layer 16.

The needling process also provides the ability to make wider sections of filter material than would otherwise be possible. Standard melt-blown machines are only 60 inches wide, although some reach 100 inches wide. By comparison, many of the filters required for standard industrial applications are 72–96 inches wide. By slightly overlapping the melt-blown layers and the spun-bonded layers, a roll of filter material can be created that is, for example, 180 inches wide. The needling of the fibrous felt material into the layers of melt-blown and/or spun-bonded material secures the layers together with no obvious weaknesses at the overlaps.

The invention also contemplates a method of forming a filter medium 10 of the type discussed above. The method comprises the steps of first providing a substrate layer 16 of composite fiber, or SMS material, including melt-blown fibers 18 interspersed between groups of spun-bonded fibers 20. Next, an intermediate layer 14 of melt-blown material is disposed between a top layer 12 of fibrous felt material and the substrate of SMS material 16. The top layer 12, intermediate layer 14, and substrate layer 16 are then needled together to form an integrated layer 10 of filter material. Further, the needling begins from the upstream side of the filter medium at the fibrous felt layer 12 and extends through the filter medium 10 and through the substrate layer 16. The method also contemplates the specific steps involved in forming the substrate layer 16 of SMS material as discussed above, including applying heat and pressure to extruded groups of polymeric melt-blown and spun-bonded fibers 18,20 to form a composite layer 16 of SMS material.

Figure 2:
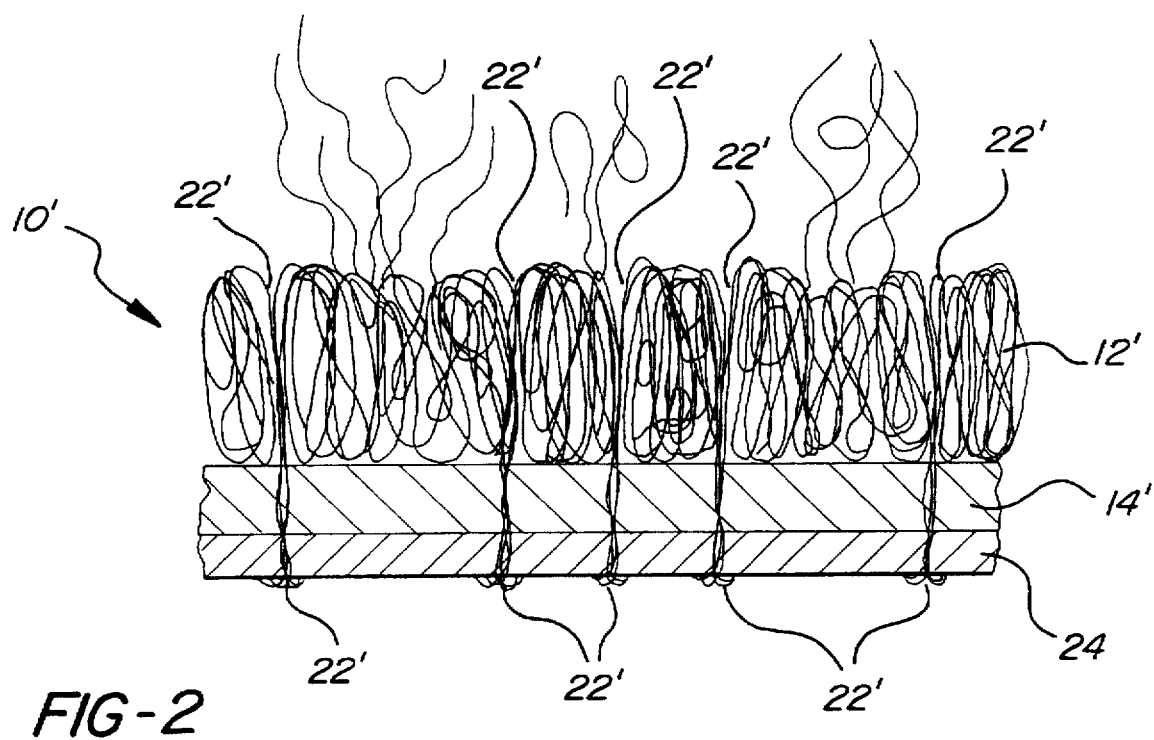
FIG. 2 is an enlarged cross-sectional view of a second embodiment of the filter medium invention.

A second embodiment of the invention is shown at 10' in FIG. 2 and includes a top layer 12' of fibrous needle felt and an intermediate layer 14' of melt-blown material. With respect to the material composition, denier, size, weight, thickness, and other factors, the intermediate layer and top layer are essentially the same as in the first embodiment. The second embodiment includes a substrate layer 24 of spun-bonded material on a downstream side of the filter medium, as opposed to the SMS substrate of the first embodiment. The top layer 12', intermediate layer 14', and substrate layer 24 are needled together to form an integrated layer 10' of filter material. The needling process is also the same as the first embodiment with regard to the gauge and density of the needles used and the size of the corresponding needle holes 22'.

In the second embodiment, the spun-bonded substrate 24 comprises a polyester material having a thickness of 0.008 to 0.020 inches, a weight of 1.5 ounces per square yard, and a fiber diameter of between 20 and 40 microns.

The second embodiment is advantageous in applications where high strength and capacity are required instead of the added efficiency of the SMS layer. Without the additional melt-blown layer 18 of the SMS substrate 16, the filter medium 10' of the second embodiment provides even greater particulate holding capacity and longer life than the first embodiment. The substrate of spun-bonded material 24 is also stronger than the composite SMS layer 16 due to the relative weakness of the melt-blown fibers 18 within the SMS layer 16 compared to a substrate 24 of pure spun-bonded fibers. In applications wherein a very high flow pressure is utilized through the filter medium, the added strength of the spun-bonded substrate 24 would be warranted.

The invention has been described in illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims the invention may be practiced otherwise than as specifically described.

What is claimed is:

1. A filter medium of the type supported across a fluid flow passage for collecting particulate out of the fluid, said filter medium comprising:
   a substrate layer;
   said substrate layer being formed of a composite fiber including a group of melt-blown fibers interspersed between groups of spun-bonded fibers;
   an intermediate layer of melt-blown material disposed adjacent said substrate layer; and
   a top layer of fibrous felt material disposed adjacent said intermediate layer wherein said intermediate layer, said top layer, and said substrate layer are needled together to form an integrated layer of filter material which can remove a high percentage of particulate from the fluid flow while retaining a high particulate holding capacity.

2. A filter medium as set forth in claim 1 wherein said substrate is formed of a group of extruded polymeric melt-blown fibers interspersed between first and second groups of extruded polymeric spun-bonded fibers which are formed into a composite layer through the application of heat and pressure to said groups of melt-blown and spun-bonded fibers.

3. A filter medium as set forth in claim 1 wherein said substrate is formed of SMS material.

4. A filter medium as set forth in claim 1 wherein said group of melt-blown fibers in said substrate layer has a weight less than 0.6 ounces per square yard.

5. A filter medium as set forth in claim 1 wherein said group of melt-blown fibers in said substrate layer has a weight of approximately 0.2 ounces per square yard.

6. A filter medium as set forth in claim 1 wherein said filter medium has a total weight of between 3.5 and 5.5 ounces per square yard.

7. A filter medium as set forth in claim 1 wherein said top layer comprises a polyester needle felt having a weight of approximately 2.0 ounces per square yard.

8. A filter medium as set forth in claim 1 wherein said intermediate layer comprises a polypropylene melt-blown material having a weight of approximately 1.0 ounces per square yard.

9. A filter medium as set forth in claim 1 wherein said substrate layer has a total weight of between 1.5 and 2.5 ounces per square yard.

10. A filter medium as set forth in claim 1 including needle holes disposed through said top layer, said intermediate layer, and said substrate layer.

11. A filter medium as set forth in claim 10 wherein said needle holes in said intermediate layer are offset from said needle holes in said substrate layer.

12. A filter medium of the type supported across a fluid flow passage for collecting particulate out of the fluid, said filter medium comprising:
    a substrate layer of spun-bonded material on a downstream side of said filter medium;
    an intermediate layer of melt-blown material disposed adjacent said substrate layer; and
    a top layer of fibrous felt material disposed adjacent said intermediate layer wherein said intermediate layer, said top layer, and said substrate layer are needled together to form an integrated filter material which can remove a high percentage of particulate from the fluid flow while retaining a high particulate holding capacity.

13. A filter medium as set forth in claim 12 including needle holes disposed through said top layer, said intermediate layer, and said substrate layer.

14. A filter medium as set forth in claim 13 wherein said needle holes in said intermediate layer are offset from said needle holes in said substrate layer.

15. A filter medium as set forth in claim 12 wherein said substrate layer comprises a polymeric spun-bonded material having a weight of between 1.5 and 2.5 ounces per square yard.

16. A filter medium as set forth in claim 12 wherein said filter medium has a total weight of between 3.5 and 5.5 ounces per square yard.

17. A filter medium as set forth in claim 12 wherein said top layer comprises a polyester needle felt having a weight of approximately 2.0 ounces per square yard.

18. A filter medium as set forth in claim 12 wherein said intermediate layer comprises a polypropylene melt-blown material having a weight of approximately 1.0 ounces per square yard.

19. A method of forming a filter medium of the type supported across a fluid flow passage for collecting particulate out of the fluid, said method comprising the steps of:
    providing a substrate layer of composite fiber including melt-blown fibers interspersed between groups of spun-bonded fibers;
    placing an intermediate layer of melt-blown material adjacent the substrate layer;
    placing a top layer of fibrous felt material adjacent the intermediate layer on an upstream side of the filter medium to sandwich the intermediate layer between the substrate layer and the top layer; and
    needling the top layer, intermediate layer, and substrate layer together to form an integrated layer of filter material.

20. A method as set forth in claim 19 including the step of forming the substrate layer by extruding a first group of spun-bonded polymeric fibers, extruding a group of melt-blown polymeric fibers, extruding a second group of spun-bonded polymeric fibers, placing the group of melt-blown fibers between the groups of spun-bonded fibers, and applying heat and pressure to the groups of fibers to form an composite layer of material.

21. A method as set forth in claim 19 including needling the filter medium from the upstream side of the filter medium.

22. A method as set forth in claim 19 including utilizing 40 gauge needles at a density of 250 per linear inch during said step of needling.

* * * * *